United States Patent [19]

Nohira

[11] 3,974,806

[45] Aug. 17, 1976

[54] GAS LABYRINTH CARBURETOR THROTTLE SHAFT SEAL

[75] Inventor: Hidetaka Nohira, Susono, Japan

[73] Assignee: Toyota Jidosha Kogyo Kabushiki Kaisha, Japan

[22] Filed: June 15, 1973

[21] Appl. No.: 370,208

[30] Foreign Application Priority Data
Aug. 4, 1972   Japan............................. 47-77678

[52] U.S. Cl............................ 123/119 R; 277/15; 277/53; 277/71; 308/9; 308/36.3
[51] Int. Cl.² ................... F02M 17/00; F16C 1/24; F16C 33/80; F16J 15/40
[58] Field of Search................. 308/9, 36.3, 36.1; 277/15, 53, 71, 135 J; 123/119 R

[56] References Cited
UNITED STATES PATENTS

| | | | |
|---|---|---|---|
| 2,230,311 | 2/1941 | Seymour | 123/119 R |
| 2,313,258 | 3/1943 | Olson | 123/119 R X |
| 2,891,528 | 6/1959 | Dolza et al. | 123/119 R |
| 3,018,766 | 1/1962 | Francis | 123/119 R |
| 3,030,744 | 4/1962 | Mueller | 308/9 |
| 3,321,254 | 5/1967 | Dock | 308/9 |
| 3,447,519 | 6/1969 | Marcik et al. | 123/119 R X |
| 3,586,967 | 6/1971 | Peyrot et al. | 308/9 |

FOREIGN PATENTS OR APPLICATIONS

| | | | |
|---|---|---|---|
| 802,861 | 10/1958 | United Kingdom | 277/15 |

Primary Examiner—Robert J. Spar
Assistant Examiner—Howard Beltran
Attorney, Agent, or Firm—Toren, McGeady and Stanger

[57] ABSTRACT

In an carburetor where a shaft is positioned within a bearing section and there is no lubricant, such as oil or water, used between the shaft and bearing section, a flow of pressurized air is directed through a passageway into the bearing section and then into a slot which extends in the circumferential direction so that air can be directed axially between the shaft and the bearing section. The flow of air prevents the entry of any alien substances, such as dust or moisture, into the space between the shaft and the bearing section.

1 Claim, 7 Drawing Figures

GAS LABYRINTH CARBURETOR THROTTLE SHAFT SEAL

BACKGROUND OF THE INVENTION

1. Field of the Invention

The present invention is directed to an arrangement for preventing the admission of alien substances into the space between a shaft and its bearing section where no lubricant, such as oil or water, is used in the space.

2. Description of the Prior Art

In machine tools and automobile engines, it is often noticed that alien substances find their way into the space between a shaft and its bearing and result in malfunctioning. For example, in a throttle shaft bearing for a carburetor in an automobile engine, it is possible that the atmosphere surrounding the carburetor may be cooled to a temperature below the dew point as a result of the gasoline vaporization heat generated during operation of the engine, and, consequently, moisture contained in the mixture may condense and form water droplets which enter the bearing section of the throttle shaft. If the atmospheric temperature falls below the freezing point when the engine is not in use, the water droplets freeze and may damage the bearing and render the engine inoperable. Further, if such a situation exists over a period of time, the bearing rusts and becomes inoperative.

Further, in an exhaust gas recirculation system which has been developed recently as an exhaust gas cleaning means, if the recirculation gas is introduced into the carburetor from a point above its throttle valve, any moisture contained in the recirculation gas may be condensed on the throttle valve and enter into the space between the valve shaft and its bearing causing problems as mentioned above.

SUMMARY OF THE INVENTION

Therefore, it is the primary object of the present invention to afford an arrangement which prevents the admission of alien substances into the space between a shaft and its bearing section so that problems resulting from the presence of alien substances in the bearing sections are avoided.

In accordance with the present invention, an air distributing slot is formed in one of the shaft or its bearing section, and compressed air from a pressurized air source, such as an air pump, is directed through pressure controlling means, such as an orifice, into a passageway through the bearing section and then into the slot. The present invention can be used not only for the carburetor in an automobile engine, but also in other apparatus which use a similar type of bearing section where the bearing sections do not use a lubricant such as oil, water and the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
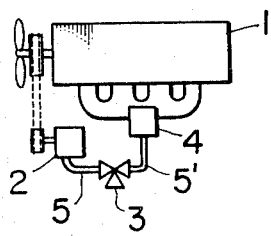
FIG. 1 is a schematic illustration of an engine incorporating an arrangement for preventing admission of alien substances into a bearing section in accordance with the present invention.
Figure 2:
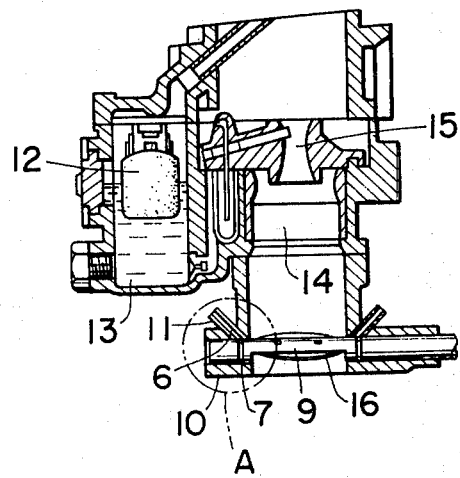
FIG. 2 is a sectional view of a carburetor incorporating the arrangement of the present invention.

In FIG. 1 an engine incorporating the arrangement of the present invention, is shown schematically and includes an engine body 1, an air pump 2 operated by the engine or by an electric motor, air distribution pipes 5, 5', a pressure regulator 3, such as an orifice, and a carburetor 4. As shown in FIG. 2, the carburetor 4 consists of a float chamber 13 containing a float 12, a mixing chamber 14 where gasoline is mixed with air, a choke valve, not shown, for adjusting the amount of air introduced into the mixing chamber, and a throttle valve 16 for controlling the amount of gas mixture passed through a venturi 15.

Figure 3:
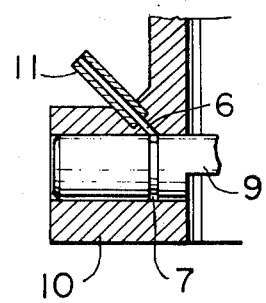
FIG. 3 is a detail sectional view of the encircled portion A in FIG. 2.
Figure 4:
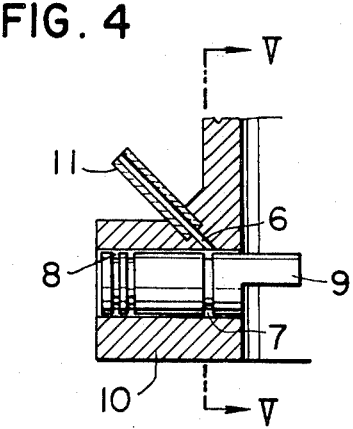
FIG. 4 is a sectional view, similar to FIG. 3, showing another embodiment of the invention.
Figure 6:
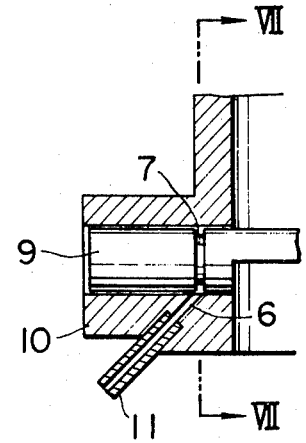
FIG. 6 is a sectional view similar to FIGS. 3 and 4 illustrating another embodiment of the present invention.

In each of FIGS. 3, 4 and 6 there is shown, in detail, a throttle shaft bearing portion in a carburetor incorporating the arrangement of the present invention. These detail views disclose a throttle shaft 9, a shaft bearing section 10 laterally enclosing the throttle shaft 9, an air slot 7 formed in and extending circumferentially about the throttle shaft, an air pipe 11 connected to the shaft bearing section, a bore 6 extending through the shaft bearing section and opening to the slot 7, and, in FIG. 4, a labyrinth 8 formed in the outer end of the throttle shaft spaced axially from the slot 7.

In the above-described arrangement, air supplied from the air pump 2 is adjusted to a suitable pressure by the pressure regulator 3 and then is directed through the air pipe 11 and the bore 6 into the slot 7 which opens to the space between the shaft 9 and the bearing section 10. The pressurized air is distributed circumferentially by the slot 7 in the shaft 9 and then flows in the axial direction of the shaft between it and the juxtaposed surfaces of the shaft bearing section 10.

Figure 5:
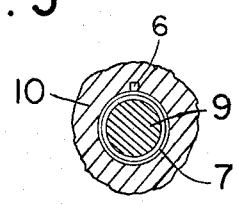
FIG. 5 is a sectional view taken along the line V—V in FIG. 4.
Figure 7:
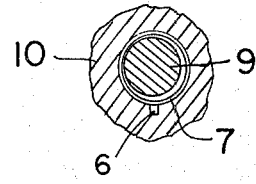
FIG. 7 is a sectional view taken along the line VII—VII of FIG. 6.

While the slot 7 is shown formed in the throttle shaft, it may also be machined in the bearing section side and perform the similar function. With regard to the configuration of the slot 7, it is considered most practical to machine it as an annular slot extending about the entire circumferential periphery of the shaft 9, as shown in FIG. 5. Such an annular slot is used when the shaft makes a rotating motion, however, if the shaft effects a swinging or rocking motion, a slot in the configuration shown in FIG. 7 can be used. Further, other configurations can be used aligned with the air pipe 11 and the bore 6 to afford uniform air flow through the space between the shaft and its bearing section. When it is desired to decrease the air flow rate in one of the portions on both sides of the throttle shaft, it is possible to control the flow rate by means of a labyrinth 8, such as illustrated in FIG. 4.

As described above, by employing the arrangement embodying the present invention, it is possible to prevent the admission of water, oil, dust and other alien substances into a bearing section for eliminating any possibility of malfunction due to the presence of such substances or the freezing of moisture. In the case of bearing sections in an automobile, an air injection pump can be used as the air supply source. The present invention has proved most effective when used where the shaft has a small diameter and it is difficult to machine a groove for fitting an O-ring or an oil seal into the bearing section.

While specific embodiments of the invention have been shown and described in detail to illustrate the application of the inventive principles, it will be understood that the invention may be embodied otherwise without departing from such principles.

What is claimed is:

1. In a carburetor comprising a tubular wall member forming a flow passageway including a venturi and a mixing chamber, a throttle valve located within the flow passageway, said throttle valve including a throttle shaft, wherein the improvement comprises that said tubular wall member forms a bore-like bearing section opening into the flow passageway, said throttle shaft supported in said bore-like bearing section, means for preventing the admission of alien substances into said bearing section about said shaft, said means including an annular slot extending in the circumferential direction about said throttle shaft and formed in said shaft, means for introducing compressed air through said tubular wall member from the exterior of the carburetor into said slot for distribution of the compressed air from said slot between said throttle shaft and said bearing section so that the flow of compressed air forms a gas lubricated bearing therebetween and prevents alien substances, such as dust, moisture and the like, from entering into said bearing section, and a labyrinth formed in said throttle shaft within said bearing section and spaced axially of said throttle shaft from said slot and located on the opposite side of said slot from the flow passageway for controlling the air flow rate between said shaft and said bearing section.

* * * * *